W. C. SABINE.
DEVICE FOR PREVENTING THE TRANSMISSION OF SOUND.
APPLICATION FILED JULY 8, 1914.
1,172,838.
Patented Feb. 22, 1916.
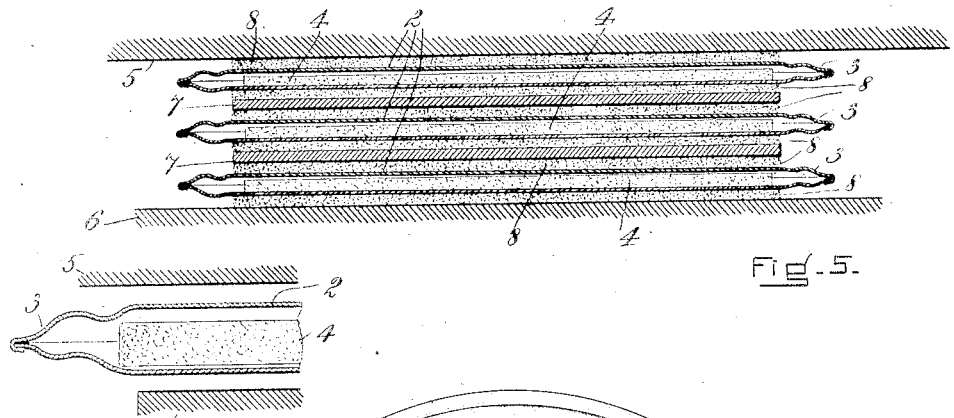
Fig. 5.
Fig. 2.
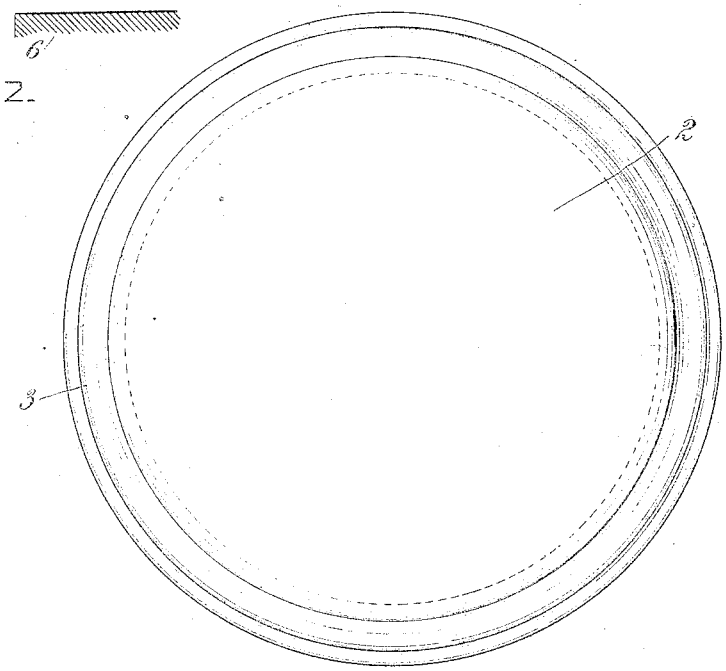
Fig. 1.
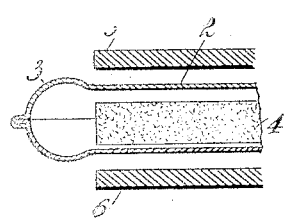
Fig. 3.
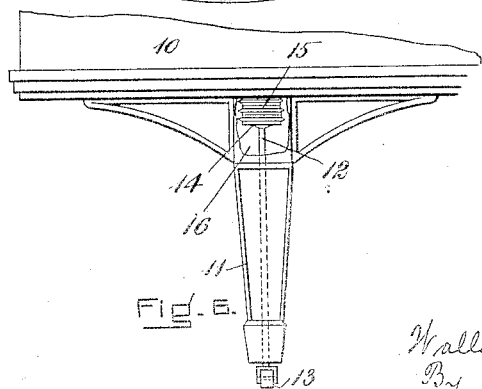
Fig. 6.
Fig. 4.
WITNESSES:
M. E. Flaherty
A. E. O'Brien
INVENTOR:
Wallace C. Sabine
By
Coale & Hay
his attorneys.

UNITED STATES PATENT OFFICE.

WALLACE C. SABINE, OF BOSTON, MASSACHUSETTS.

DEVICE FOR PREVENTING THE TRANSMISSION OF SOUND.

1,172,838.  Specification of Letters Patent.  Patented Feb. 22, 1916.

Application filed July 8, 1914. Serial No. 849,861.

*To all whom it may concern:*

Be it known that I, WALLACE C. SABINE, of Boston, in the county of Suffolk and State of Massachusetts, a citizen of the United States, have invented a new and useful Improvement in Devices for Preventing the Transmission of Sound, of which the following is a full, clear, and exact description, reference being had to the accompanying drawings, forming a part of this specification in explaining its nature.

This invention relates to a device for preventing the transmission of sound through supports or bearings subjected to pressure.

While I have in practice provided sound insulation by the employment of a discontinuity of material possessing differences in elasticity and density, as for example iron and felt, yet under conditions of pressure this fails, the pressure tending to eliminate the acoustical differences between the strata.

It is accordingly the essential object of my invention to provide for the sound insulation of objects exerting pressure by a support or bearing practically impervious to sound vibration and which will present the greatest acoustical discontinuity in its elements under those conditions of pressure to which it may be subjected.

The device embodying my invention essentially comprises a support or bearing in which the pressure is borne almost wholly by air or gaseous fluid compressed within an hermetic cell which tends to take up the vibration and the walls of which with relation to the compressed gas furnish the discontinuity producing the desired insulation.

The device comprising my invention can best be seen and understood by reference to the drawings in which is shown embodiments thereof and also an example of the application of the device.

In the drawings:—Figure 1 is a plan of one of the sound-insulating hermetic cells. Fig. 2 is a cross sectional detail of a portion of the cell in conjunction with a supported object and supporting base, these parts being shown diagrammatically. Figs. 3 and 4 are cross sectional details of modified forms of the sound-insulating cell. Fig. 5 is a cross section showing a further embodiment of the sound-insulating device, and Fig. 6 is a view partly in side elevation and partly in section of a portion of a piano body, leg and the device applied thereto for sound-insulating the body.

Referring to the drawings:—1 represents the hermetic cell containing air or other gaseous fluid. The wall 2 of the cell is made of thin metal or other material possessing radically different acoustic properties from the air within the cell. The wall is also so shaped and so compressible that in practice the load is substantially supported by the compression of air or gaseous fluid within the cell.

In order to prevent the transmission of sound through the metal around the edge of the cell and to make the cell more compressible it is provided with a flexible edge or rim 3. Such effect may be obtained in various ways as by bending or otherwise corrugating the metal around the edge or rim of the cell as shown in Figs. 2, 3 and 4. The cell is preferably made in separate half sections by dieing or stamping and the respective sections then secured together and hermetically sealed in any suitable manner as by soldering.

The cell permits of the use within it of some sound-absorbing material 4 which augments the sound insulation obtained by the cell itself in that it prevents resonance within it.

In its application the device is placed between the load or object for which the support provides a bearing, and the base to which the sound might otherwise be transmitted from the object if the device was not used. Such application is shown in Figs. 2, 3, and 4, in which 5 represents the object and 6 the base. In some cases a battery of cells is preferably employed. In such case I preferably associate with the cells one or more plates or sheets 7 of metal. These plates form not only an important factor in diminishing the transmission of sound by providing further discontinuity of media, but they also serve to distribute the pressure uniformly over the cells. To make the application of pressure still more uniform and to prevent also the touching of metal surfaces which might lead to metallic rattling, I prefer to interpose felt or other non-metallic material 8 between the plates 7 and the cell or cells 1. Owing to the fact that the felt 8 is under heavy compression it has but little effect in the insulation of sound.

The device is especially valuable in the support of pianos, the modern piano leg being admirably adapted to receive it. An example of such application is shown in Fig. 6 where 10 represents the body of the piano, 11 the leg provided with the usual metal core 12 which forms the main support and to which the caster 13 is secured. The core 12 is provided with a supporting head plate 14 and between this plate and the body of the piano is located the insulating device comprising my invention, the same being socketed within the recess 15 preformed within the leg. With the parts thus arranged, the piano rests upon the device which in turn is supported by the core of the leg, the device preventing the transmission of sound from the body of the piano to the core of the leg and floor or base upon which the core may be resting.

Having thus fully described my invention, I claim and desire to secure by Letters Patent of the United States:—

1. The combination with an object exerting pressure and a base, of a sound-insulating device interposed between said object and base holding the same out of contact with one another, said device comprising an hermetic cell having a metallic shell the metal of which is flexible and under tension and which cell contains a gaseous fluid.

2. A sound-insulating device comprising an hermetic cell having a compressible, metallic shell containing a gaseous fluid and associated therewith a stratum of heavy mass.

3. A sound-insulating device comprising an hermetic cell having a compressible, metallic shell containing a gaseous fluid and associated therewith a stratum of heavy mass and also a stratum of some sound-absorbing material.

4. A sound-insulating device comprising a compressible, hermetic cell containing both a gaseous fluid and some fibrous, sound-absorbing material.

5. A sound-insulating device comprising a compressible, hermetic cell containing both a gaseous fluid and some fibrous, sound-absorbing material, and associated therewith a stratum of heavy mass.

6. In a sound-insulating device, the combination of a plurality of hermetic cells, each having a compressible, metallic shell containing a gaseous fluid, and sound-absorbing material interposed between said cells.

7. In a sound-insulating device, the combination of hermetic cells each containing a gaseous fluid, a metallic plate, and layers of some non-metallic material interposed between said plate and said cells.

8. In a sound-insulating device, the combination of hermetic cells each containing a gaseous fluid and some sound-absorbing material, a metallic plate, and layers of some non-metallic material interposed between said plate and said cells.

WALLACE C. SABINE.

Witnesses:
JOHN E. P. HAYES,
M. E. FLAHERTY.